United States Patent Office 3,490,739
Patented Jan. 20, 1970

3,490,739
AZEOTROPIC COMPOSITION CONTAINING HEXAFLUOROACETONE, HYDROGEN FLUORIDE, AND TRICHLOROTRIFLUOROETHANE
Walter R. Buckman, 9977 W. Tams Drive, Baton Rouge, La. 70815, and William R. Clemmons, 7174 Walker Drive, Baker, La. 70714
No Drawing. Original application Sept. 16, 1965, Ser. No. 487,917, now Patent No. 3,406,099, dated Oct. 15, 1968. Divided and this application May 24, 1968, Ser. No. 749,232

Int. Cl. C09k 3/00
U.S. Cl. 252—60                    1 Claim

ABSTRACT OF THE DISCLOSURE $CF_3COCF_3$, HF and $CCl_2FCClF_2$ form a constant boiling azeotrope which, at about atmospheric pressure, boils at about 13° C. and contains about 44 mole percent of $CF_3COCF_3$, about 42.2 mole percent HF and about 13.8 mole percent of $CCl_2FCClF_2$.

---

This is a division of application Ser. No. 487,917 filed Sept. 16, 1965, and now Patent No. 3,406,099.

This invention relates to a novel azeotropic composition and its use in azeotropic distillation procedures. More particularly, the invention relates to a novel azeotropic mixture of $CF_3COCF_3$ (hexafluoroacetone), HF (hydrogen fluoride) and $CCl_2FCClF_2$ (1,1,2-trichlorotrifluoroethane) and to a procedure for separating $CF_3COCF_3$, HF or $CCl_2FCClF_2$ from mixtures containing one or more of these materials. In a preferred embodiment the invention relates to separating $CCl_2FCClF_2$ from mixtures containing it and dichlorotetrafluoroacetone (sym- or unsym-).

In the production of dichlorotetrafluoroacetone from hexachloroacetone, or other lesser fluorinated perchlorofluoroacetones, with HF in liquid phase, in the presence of an antimony catalyst (the subject of U.S. Patent 2,853,524 to Miller and Woolf), $CCl_2FCClF_2$ is unavoidably formed as a decomposition product. For commercial development applications, it is desirable to obtain dichlorotetrafluoroacetone at least about 99% pure. Since both sym- and unsym-dichlorotetrafluoroacetone (hereinafter generically referred to as 4FK) have boiling points of about 45° C. and $CCl_2FCClF_2$ has a boiling point of about 47° C., separation of $CCl_2FCClF_2$ from 4FK by distillation is extremely difficult and purification, in large amounts, by ordinary distillation to substantially more than 99% is not at all feasible.

We have found, quite unexpectedly, that $CF_3COCF_3$ (B.P. −27.7° C.), HF (B.P. 19.5° C.) and $CCl_2FCClF_2$ (B.P. 47.7° C.) when mixed together, form a constant boiling azeotrope boiling at about 13° C. at about atmospheric pressure and having a weight percent composition of 68.0:7.9:24.1 or a molar percent composition of 44.0:42.2:13.8, or about a 4:4:1 molar ratio of $$CF_3COCF_3/HF/CCl_2FCClF_2$$

We have also found that this azeotrope can be used to separate $CF_3COCF_3$, HF or $CCl_2FCClF_2$ from mixtures containing one or more of these materials, provided that other components of the mixture do not possess boiling points unduly close to the boiling point of the azeotropic mixture (i.e., about 13° C.) and provided that other components in the mixture do not interfere with the formation of the azeotrope.

We have further found that this method is particularly effective for separating $CCl_2FCClF_2$ from 4FK..

It is accordingly an object of this invention to provide a novel constant boiling azeotropic mixture containing the components $CF_3COCF_3$, HF and $CCl_2FCClF_2$.

It is another object of the invention to provide an azeotropic distillation procedure for separating $CF_3COCF_3$, HF or $CCl_2FCClF_2$ from mixtures containing one or more of these materials.

A particular object of the invention is to provide an azeotropic distillation procedure for purifying 4FK.

Other objects and advantages of the invention will become apparent from the following description.

The azeotrope of the invention is easily formed by bringing together its components in proper proportions, or by bringing together the components in any proportions followed by distillation to remove excess $CF_3COCF_3$ (B.P. −27.7° C.) as distillate and recovery of the azeotrope as distillate leaving a residue of HF and $CCl_2FCClF_2$.

In use of the azeotrope in azeotropic distillation procedures, there need only be added sufficient amount(s) of the lacking component(s) to completely tie up the remaining component(s). For instance, in the preferred embodiment, crude fluoroketone product from a liquid phase antimony pentahalide catalyzed fluorination procedure, as described heretofore, is supplied with enough $$CF_3COCF_3$$

and HF in order to quantitatively tie up the undesired $CCl_2FCClF_2$ as the invention azeotrope. Precise quantitative amounts need not be employed as long as there is enough $CF_3COCF_3$ and HF present to completely tie up the $CCl_2FCClF_2$. Large excesses of $CF_3COCF_3$ (B.P. −27.7° C.) and HF (B.P. 19.5° C.) will not deleteriously affect the purification procedure for 4FK (B.P. 45° C.) since the boiling points of these materials are sufficiently distinct as to permit effective separation by ordinary distillation means.

Operating pressures during the azeotropic distillation procedures are not critical and may be atmospheric, subatmospheric or superatmospheric. Atmospheric pressure is usually most convenient and is therefore preferred.

Apparatus suitable for preparation of the azeotrope includes vertually any vessel or system in which contact of the three components can be effected, the materials of which are inert to the components. Glass, for instance, should be avoided because of the use of HF. Normally, the azeotrope is formed in the purification apparatus in situ. Such apparatus may be of conventional design for azeotropic distillations and typically includes a fractionating column provided with a reboiler at the bottom and a condenser connected to the top, which condenser is in turn provided with suitable cooling means. Conventional continuous distillation apparatus may be employed, as well as batch-type stills.

The same principles and techniques may be used to separate any of $CF_3COCF_3$, HF or $CCl_2FCClF_2$ from mixtures containing the same with the limitations mentioned heretofore. Other applications will readily occur to those of ordinary skill in the art and potential interference of other materials in the mixture with formation of the azeotrope can be ascertained by routine testing.

The following illustrate practice of the invention:

EXAMPLE 1

A Monel still provided with a 5′ x 1¼″ column, a reboiler of about one gallon capacity and a condenser equipped with a cold methanol circulation pump was evacuated and, at room temperature, was charged with an equimolar mixture of $CCl_2FCClF_2$ (750 g.) and HF (80 g.). An equimolar amount (637 g.) of $CF_3COCF_3$ was then bubbled into the liquid in the still through a dip line. While the $CF_3COCF_3$ was charged, the overhead condenser was maintained at about −60° C. About half of the still contents were distilled off at about 15 p.s.i.a. A large fraction was recovered at about 13° C. Gas chromatographic analysis showed that this fraction consisted of about 7.9 weight percent (42.2 mole percent)

HF, 68.0 weight percent (44.0 mole percent) $CF_3COCF_3$ and 24.1 weight percent (13.8 mole percent) $CCl_2FCClF_2$.

EXAMPLE 2

A crude charge, from a liquid phase antimony pentahalide catalyzed HF fluorination of hexachloroacetone, obtained substantially as described in U.S. Patent 2,853,524, containing 191 lbs. of 4FK and 5 lbs. of $CCl_2FCClF_2$ was subjected to a batch distillation procedure in a 4″ ga. steel still, similar to that described in Example 1. 158 lbs. of 4FK, containing an average of 2.6% by weight of $CCl_2FCClF_2$ was obtained, as ascertained by gas chromatographic analysis. Of this amount only 21 lbs. of 4FK were obtained that contained less than 1% by weight of $CCl_2FCClF_2$.

A second batch distillation was carried out in the same apparatus, with a crude charge from the same source, as described above, which contained 141 lbs. of 4FK and 3 lbs. of $CCl_2FCClF_2$. In the second distillation, however, 17 lbs. of HF and 6 lbs. of $CF_3COCF_3$, quantities considerably more than enough to form the $$CF_3COCF_3/HF/CCl_2FCClF_2$$

azeotrope, were added to the charge prior to distillation. In the ensuing distillation, 140 lbs. of 4FK containing less than 0.155 by weight of $CCl_2FCClF_2$ were recovered.

We claim:
1. An azeotropic composition, which at about atmospheric pressure, contains about 44 mole percent of $CF_3COCF_3$, about 42.2 mole percent of HF and about 13.8 mole percent of $CCl_2FCClF_2$ and boils at about 13° C.

References Cited

UNITED STATES PATENTS 2,999,815   9/1961   Eiseman _____ 252—67
3,394,878   7/1968   Eiseman _____ 252—67

OTHER REFERENCES

Azeotropic Data, American Chemical Society, 1952, p. 5.
International Encyclopedia of Chemical Science, Van Nostrand Co., 1964, p. 96.

LEON D. ROSDOL, Primary Examiner

I. GLUCK, Assistant Examiner

U.S. Cl. X.R.

62—112; 203—52, 62, 67; 252—67, 171

PO-1050
(5/69)

UNITED STATES PATENT OFFICE
CERTIFICATE OF CORRECTION

Patent No. 3,490,739          Dated January 20, 1970

Inventor(s) Walter R. Buckman and William R. Clemmons

It is certified that error appears in the above-identified patent and that said Letters Patent are hereby corrected as shown below:

Column 1, line 7, after the zip code "70714", the following words should be inserted: --, Assignors to Allied Chemical Corporation, New York, New York, a corporation of New York--

SIGNED AND
SEALED
NOV 17 1970

(SEAL)
Attest:

Edward M. Fletcher, Jr.
Attesting Officer

WILLIAM E. SCHUYLER, JR.
Commissioner of Patents